United States Patent
Amar et al.

(10) Patent No.: US 11,080,667 B2
(45) Date of Patent: Aug. 3, 2021

(54) SYSTEM AND METHOD FOR AUTOMATED CHATBOTS

(71) Applicant: Visa International Service Association, San Francisco, CA (US)

(72) Inventors: Sumit Amar, Foster City, CA (US); Cheryl Lynn Wu, Alameda, CA (US); Abdulvafa Choudhary, Fremont, CA (US); James Cao, San Francisco, CA (US); Dennis Franklin Olson, San Francisco, CA (US); Srinivas Bhagavathula, San Francisco, CA (US); Sunit Lohtia, San Rafael, CA (US); Mayur Vijay Jain, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 32 days.

(21) Appl. No.: 16/219,124

(22) Filed: Dec. 13, 2018

(65) Prior Publication Data
US 2019/0180258 A1    Jun. 13, 2019

Related U.S. Application Data

(60) Provisional application No. 62/598,220, filed on Dec. 13, 2017, provisional application No. 62/598,712, filed on Dec. 14, 2017.

(51) Int. Cl.
*G06F 3/0483* (2013.01)
*G06F 9/54* (2006.01)
(Continued)

(52) U.S. Cl.
CPC ....... *G06Q 20/1085* (2013.01); *G06F 3/0482* (2013.01); *G06F 9/54* (2013.01); *G06Q 20/047* (2020.05); *H04L 51/02* (2013.01)

(58) Field of Classification Search
CPC .................................................. G06Q 20/1085
See application file for complete search history.

(56) References Cited

U.S. PATENT DOCUMENTS

| 2014/0280623 | A1* | 9/2014 | Duan | H04L 51/02 709/206 |
| 2017/0358010 | A1* | 12/2017 | Montague | G06Q 30/0275 |
| 2018/0293558 | A1* | 10/2018 | Hosp | H04L 67/306 |

OTHER PUBLICATIONS

McDermott, 2017, "Future Trends on Consumer Behavior," Acapture by PayVision.*

* cited by examiner

*Primary Examiner* — Olabode Akintola
*Assistant Examiner* — Brandon M Duck
(74) *Attorney, Agent, or Firm* — The Webb Law Firm

(57) ABSTRACT

Provided is a method for implementing an automated chatbot, including generating, with at least one processor of a transaction processing system, at least one graphical user interface including a plurality of selectable options corresponding to a plurality of chatbot options, receiving a plurality of selections from at least a subset of the plurality of chatbot options, associating the plurality of selections with at least one issuer identifier, receiving, from a chatbot system, a request message comprising the at least one issuer identifier, generating a response message comprising transaction data based on the request message and at least one chatbot option corresponding to at least one selection of the plurality of selections associated with the at least one issuer identifier, and communicating the response message to the chatbot system.

24 Claims, 10 Drawing Sheets

(51) Int. Cl.
*G06Q 20/04* (2012.01)
*H04L 12/58* (2006.01)
*G06Q 20/10* (2012.01)
*G06F 3/0482* (2013.01)

SYSTEM AND METHOD FOR AUTOMATED CHATBOTS

CROSS REFERENCE TO RELATED APPLICATIONS

This application claims the benefit of U.S. Provisional Application No. 62/598,220, filed on Dec. 13, 2017, and U.S. Provisional Application No. 62/598,712, filed on Dec. 14, 2017, the entire contents of which are hereby incorporated by reference.

BACKGROUND

Field

The present disclosure relates to automated chatbots and, in non-limiting embodiments, a system, method, and computer program product for providing automated chatbots to users.

Description of Related Art

A chatbot refers to a system which conducts a conversation via auditory or textual methods. Such systems may be designed to convincingly simulate how a human would behave as a conversational partner. In some instances, chatbots may be used in dialog systems for customer service and/or information acquisition. In some instances, chatbots may use natural language processing systems. In other instances, chatbots scan for keywords within an input, then receive a reply with the most matching keywords as the input and/or the most similar wording pattern as the input from a database.

Entities that wish to offer chatbot services to customers must build a complicated suite of software applications and services. Not only do such entities need to develop ways to parse user input and process natural language, but they also need access to a wide range of data for providing complete and accurate responses to the users. As an example, an issuer institution that wishes to provide chatbot services to its account holders may need access to merchant data, user data, and/or transaction data that it does not possess. Identifying and obtaining such data from multiple sources adds to the complexity of the necessary software applications and services.

SUMMARY

According to a non-limiting embodiment, provided is method for implementing an automated chatbot, including: generating, with at least one processor of a transaction processing system, at least one graphical user interface comprising a plurality of selectable options corresponding to a plurality of chatbot options; receiving, through the graphical user interface, a plurality of selections from at least a subset of the plurality of chatbot options; associating, in a database of the transaction processing system, the plurality of selections with at least one issuer identifier; receiving, from a chatbot system, a request message comprising the at least one issuer identifier; generating, with the at least one processor of the transaction processing system, a response message comprising transaction data based on the request message and at least one chatbot option corresponding to at least one selection of the plurality of selections associated with the at least one issuer identifier; and communicating, with the at least one processor of the transaction processing system, the response message to the chatbot system.

According to another non-limiting embodiment, provided is a system for implementing an automated chatbot, including: at least one processor in communication with a transaction processing system, the at least one processor programmed and/or configured to: generate at least one graphical user interface comprising a plurality of selectable options corresponding to a plurality of chatbot options; receive a plurality of selections from at least a subset of the plurality of chatbot options; associate, in a database of the transaction processing system, the plurality of selections with at least one issuer identifier; receive, from a chatbot system, a request message comprising the at least one issuer identifier; generate a response message comprising transaction data based on the request message and at least one chatbot option corresponding to at least one selection of the plurality of selections associated with the at least one issuer identifier; and communicate the response message to the chatbot system.

According to another non-limiting embodiment, provided is a computer program product for implementing an automated chatbot, including at least one non-transitory computer-readable medium including program instructions that, when executed by at least one processor, cause the at least one processor to: generate at least one graphical user interface comprising a plurality of selectable options corresponding to a plurality of chatbot options; receive a plurality of selections from at least a subset of the plurality of chatbot options; associate, in a database, the plurality of selections with at least one identifier; receive, from an chatbot system, a request message comprising the at least one identifier; generate a response message comprising transaction data based on the request message and at least one chatbot option corresponding to at least one selection of the plurality of selections associated with the at least one identifier; and communicate the response message to the chatbot system These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the claimed invention. As used in the specification and the claims, the singular form of "a," "an," and "the" include plural referents unless the context clearly dictates otherwise.

DETAILED DESCRIPTION

Figure 1:
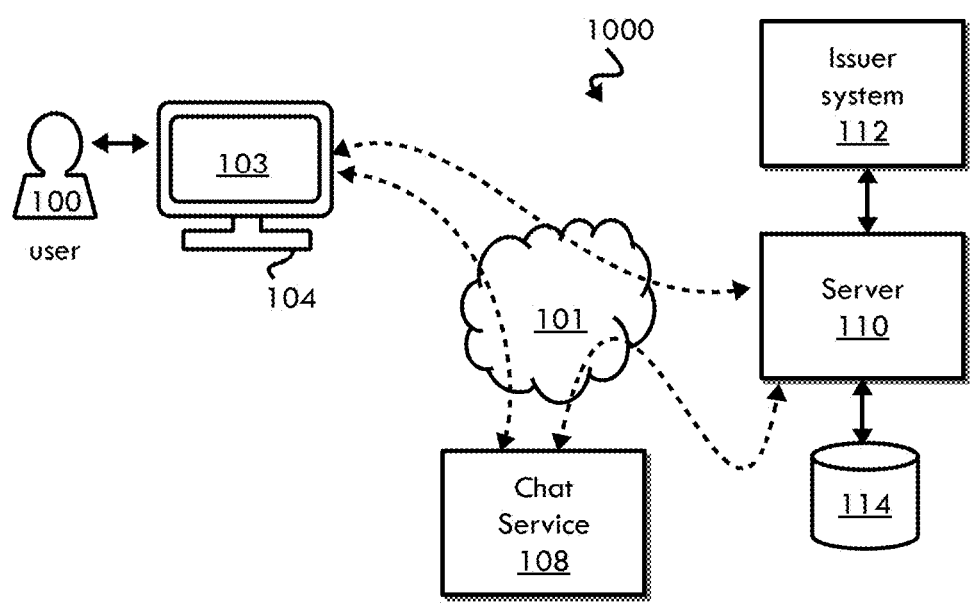
FIG. 1 illustrates a schematic diagram of a non-limiting embodiment of a system for providing an automated chatbot service.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection and may be wired and/or wireless in nature. Additionally, two units or devices may be in communication with each other even though the data transmitted may be modified, processed, routed, etc. between the first and second unit or device. It will be appreciated that numerous arrangements are possible. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction, one or more issuer chatbot systems, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A merchant may include a point-of-sale (POS) system, which may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "computing device" may refer to one or more electronic devices that are configured to process data. A computing device may be a mobile device, a stationary personal computer, a server computer, and/or the like. As an example, a computing device may include a cellular phone (e.g., a smartphone or standard cellular phone), a portable computer, a wearable device (e.g., watches, glasses, lenses, clothing, and/or the like), a personal digital assistant (PDA), and/or other like devices.

As used herein, the term "Application Programming Interface" (API) refers to computer code or other data on a computer-readable medium that may be executed by a processor to facilitate interaction between software components such as, for example, an application that communicates data to and/or receives data from a server. An API may receive a request to return data or perform an action. As used herein, the terms "request" and "request message" may refer to data, such as but not limited to one or more data packets or other forms of data structures, configured to cause a response from a receiving system. An API request message may be a message structured according to one or more parameters of the API. For example, an API request message may include one or more queries.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers or other computing devices, directly or indirectly communicating may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In non-limiting embodiments, an automated chatbot system is provided to provide users with access to information and/or cause actions to be performed regarding one or more portable financial devices, such as a credit card. Through plaintext inputs asking questions or making requests, users are provided with control and easy access to account information. Non-limiting embodiments of an automated chatbot service may allow users to add accounts to electronic wallets, report lost or stolen cards, notify issuers of travel plans so that permitted uses in those areas can be preapproved, notify issuers that a user is currently traveling, obtain account balances, transfer funds to other accounts or other individuals, make payments, and/or other like actions. In non-limiting embodiments, entities such as issuer institutions are enabled to select from a plurality of chatbot options to create and/or customize a chatbot service for its users. In non-limiting embodiments, data from multiple sources may be retrieved and used to generate a response to a user in the context of a chatbot service, even where the entity offering the chatbot does not have access to some or all of such data.

Referring now to FIG. 1, an automated chatbot system 1000 is shown according to a non-limiting embodiment. A computing device 104 operated by a user 100 is in communication with a server 110 over a network environment 101, such as the Internet. The device 104 displays a GUI 103 that includes a chat dialog box. The GUI 103 may be provided to the computing device 104 from a chat service 108, such as Facebook® Messenger, Google Hangouts®, Snapchat®, an SMS service, a merchant customer service system, an issuer customer service system, and/or the like, over the network 101. In some non-limiting embodiments, the chat service 108 may be a voice-based chat service, such as an Interactive Voice Response (IVR) system, and the user 100 may interact with the chat service 108 using a telephone and/or a computing device 104 having voice assistant software installed thereon.

In some non-limiting embodiments, and with continued reference to FIG. 1, the chat service 108 may include one or more servers associated with a chat service provider (e.g., Facebook®, Google®, Snapchat®, a merchant, an issuer, and/or the like) and/or a digital assistant system (e.g., Amazon's Alexa, Google Home, Apple's Siri, and/or the like). The chat service 108 may also be in communication with server 110. The server 110 may be in communication with one or more issuer systems 112 associated with issuer institutions. The server 110 may also be in communication with one or more databases 114, such as account databases and/or transaction databases. In some non-limiting examples, the issuer system 112 may also be in communication with one or more databases.

With continued reference to FIG. 1, a user 100 provides an input into the GUI 103 of the computing device 104 or otherwise provides an input to the chat service 108. For example, the computing device 104 may communicate a plaintext input from the user 100 to the chat service 108. The chat service 108 may relay the input to the server 110 to be parsed and processed to determine if further communication with the server 110 should occur. In some non-limiting examples, the chat service 108 may itself parse and process the input to determine if communication with the server 110 should occur. In this manner, the server 110 may receive a user input and/or a request generated by the chat service 108 based on the user input. The server 110 and/or chat service 108, after parsing the user input, generates at least one request based on the parsed input and one or more Application Programming Interfaces (APIs). For example, the server 110 may determine one or more APIs from a plurality of APIs based on the parsed input. In non-limiting embodiments in which the chat service 108 parses the input, the chat service 108 may generate one or more requests and communicate such requests to the server 110. The server 110 and/or chat service 108 then generates a request to retrieve specified data or to perform a specified action from the API.

Still referring to FIG. 1, the chat service 108 and/or server 110 may implement one or more natural language processing algorithms to parse the user input. Moreover, the chat service 108 and/or server 110 may also implement one or more artificial intelligence algorithms to parse the user input and to generate a request based on the parsed input. It will be appreciated that various natural language processing and machine learning techniques may be utilized. In non-limiting embodiments in which the automated chat system 1000 is implemented over a voice communication, the chat service 108 and/or server 110 may apply one or more speech recognition algorithms to convert the user's speech into text that can be parsed and processed with one or more natural language processing algorithms. Accordingly, the chat service 108 may be a textual chat environment, a voice-driven chat environment (e.g., over a telephone line, voice communication, digital assistant, etc.), and/or any other like chat environment.

Still referring to FIG. 1, in non-limiting embodiments, the chat service 108 and/or server 110 may activate alerts (e.g., transaction alerts, spending alerts, etc.) associated with an account of a user based on receiving information associated with an alert from a user via an automated chatbot service provided by chat service 108 and/or server 110. In non-limiting embodiments, chat service 108 and/or server 110 may activate restrictions (e.g., account suspensions, transaction limits, spending limits, etc.) associated with an account of a user based on receiving information associated with an alert from a user via an automated chatbot service provided by chat service 108. In non-limiting embodiments, chat service 108 and/or server 110 may communicate travel notices and receive information associated with a travel itinerary of a user via an automated chatbot service provided by chat service 108. In some non-limiting embodiments, chat service 108 and/or server 110 may communicate the travel notices and/or information associated with the travel itinerary of the user to an issuer system 112 corresponding to an account of the user 100.

With continued reference to FIG. 1, in some non-limiting embodiments the chat service 108 and/or server 110 may determine information associated with a merchant based on an input provided by a user via an automated chatbot service provided by chat service 108. In some non-limiting embodiments, chat service 108 and/or server 110 may communicate the information associated with the merchant based on receiving the input from the user via the automated chatbot service. In some non-limiting embodiments, chat service 108 and/or server 110 may determine and/or communicate account information associated with an account of a user via an automated chatbot service provided by chat service 108 and/or server 110. In some non-limiting embodiments, chat service 108 and/or server 110 may communicate merchant offer information associated with an offer from a merchant to a user via the automated chatbot service. In some non-limiting embodiments, chat service 108 and/or server 110 may communicate benefit information associated with a loyalty reward program to a user via the automated chatbot service. In some non-limiting embodiments, chat service 108 and/or server 110 may communicate location information associated with financial institutions and/or Automated Teller Machines ATMs (e.g., such as locations of ATMs) to a user via the automated chatbot service.

Figure 2A:
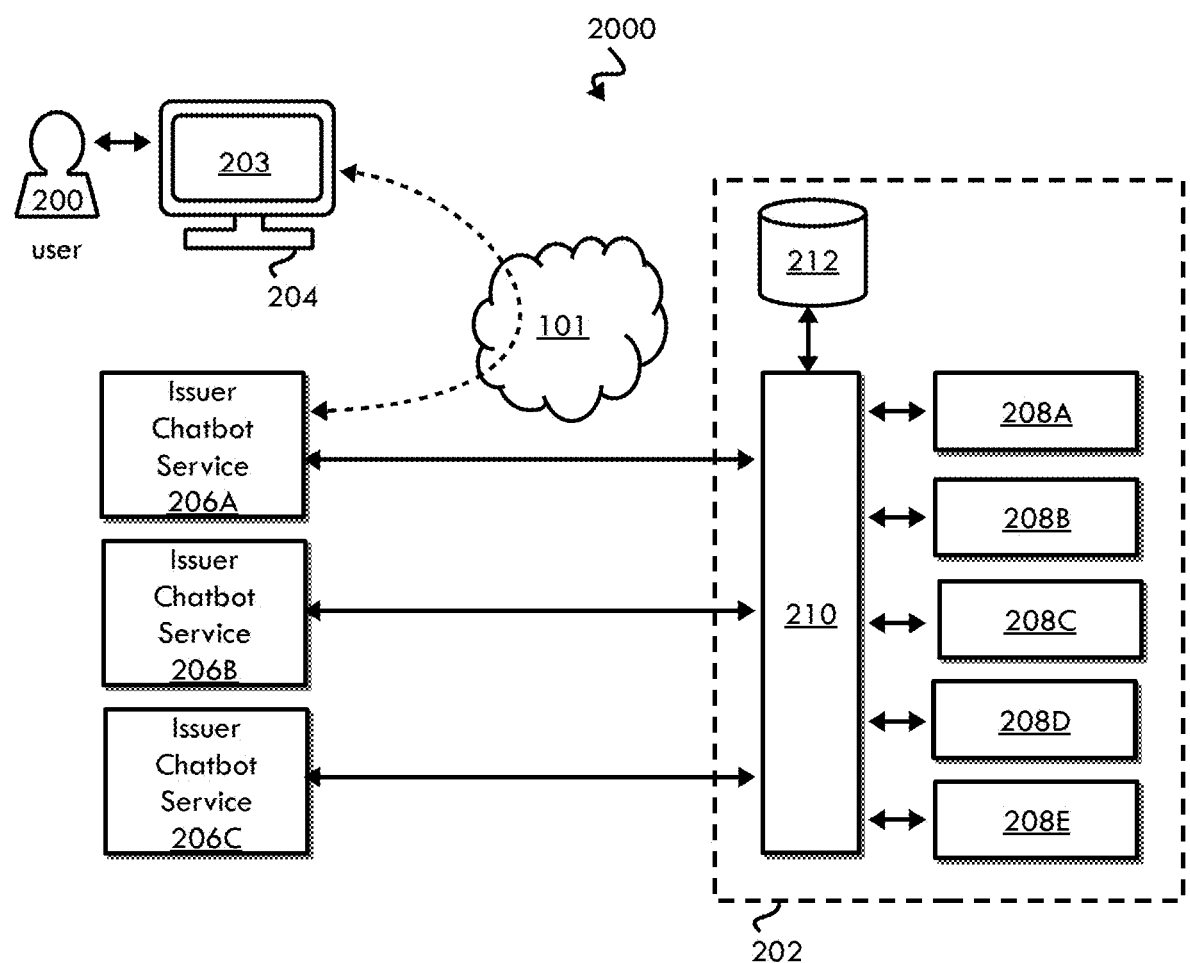
FIG. 2A illustrates a schematic diagram of a non-limiting embodiment of a system for providing an automated chatbot service.

Referring now to FIG. 2A, an automated chatbot system 2000 is shown according to a non-limiting embodiment. A plurality of issuer chatbot services 206A-206C are in communication with a transaction processing system 202. The transaction processing system 202 includes an API gateway 210 and a plurality of APIs 208A-208E corresponding to microservices and/or other systems for retrieving transaction data or performing an action. It will be appreciated that one or more APIs 208A-208E may also be external to the transaction processing system 202. As used herein, the term "microservice" refers to one or more software functions that may be part of a larger software application or may be a standalone software application. A microservice may include a function that returns a value when called from another software function or application. The API gateway 210 may be in communication with a chatbot database 212. The chatbot database 212 may store one or more issuer identifiers and/or chatbot service identifiers associated with one or more chatbot options. An issuer identifier may include a unique identifier for an issuer institution or a chatbot service operated on behalf of an issuer institution, one or more Bank Identification Numbers (BINs) assigned to an issuer institution, and/or any other value that may be used to identify an issuer, an issuer system, and/or an issuer chatbot system. In non-limiting embodiments in which a chatbot service is not associated with an issuer institution, a chatbot service identifier may include a unique identifier that identifies the chatbot service among a plurality of different chatbot services.

With continued reference to FIG. 2A, each issuer chatbot service 206A-206C may be associated with one or more chatbot options in the chatbot database 212. Such chatbot options may be selected by an administrative user during a configuration process through one or more GUIs presented to the administrative user. As an example, an administrative user of an issuer chatbot service 206A may register or log in to a portal hosted by the transaction processing system 202 and use one or more GUIs to select one or more chatbot options. As used herein, the term "chatbot option" may refer to one or more rules, interface elements, or functions for providing a chatbot service. For example, a chatbot option may include one or more rules for handling user requests, one or more rules for retrieving transaction data based on user requests or statements, one or more rules for performing an action based on user requests or statements, one or more interface elements (e.g., design or formatting parameters) for a chatbot service, one or more chatbot personas, and/or the like.

With continued reference to FIG. 2A, in non-limiting embodiments one or more of the issuer chatbot services 206A-206C may be configured to parse and process a natural language input provided by a user 200 to a GUI 203 of a computing device 204 or using different method of input (e.g., a microphone) in communication with the computing device 204. In such embodiments, the relevant issuer chatbot service from the plurality of issuer chatbot services 206A-206C may then generate one or more requests based on the user input and communicate those requests to the API gateway 210. The API gateway 210, based on the request, may redirect the request or generate a new request to one of the APIs 208A-208E. The requests generated by the issuer chatbot services 206A-206B may include, for example, one or more queries, function calls, and/or the like, and may include one or more request parameters. The APIs 208A-208E are configured to return a response based on the request. For example, a request may be communicated to an API for a microservice configured to retrieve past transactions where the request includes, as a parameter, a time period for the past transactions and an account identifier. In some examples, the API gateway 210 may enhance, modify, or supplement a request to add one or more parameters associated with the corresponding issuer chatbot service in the chatbot database 112. For example, the API gateway 210 may format a request according to an API format for a corresponding microservice.

Figure 2B:
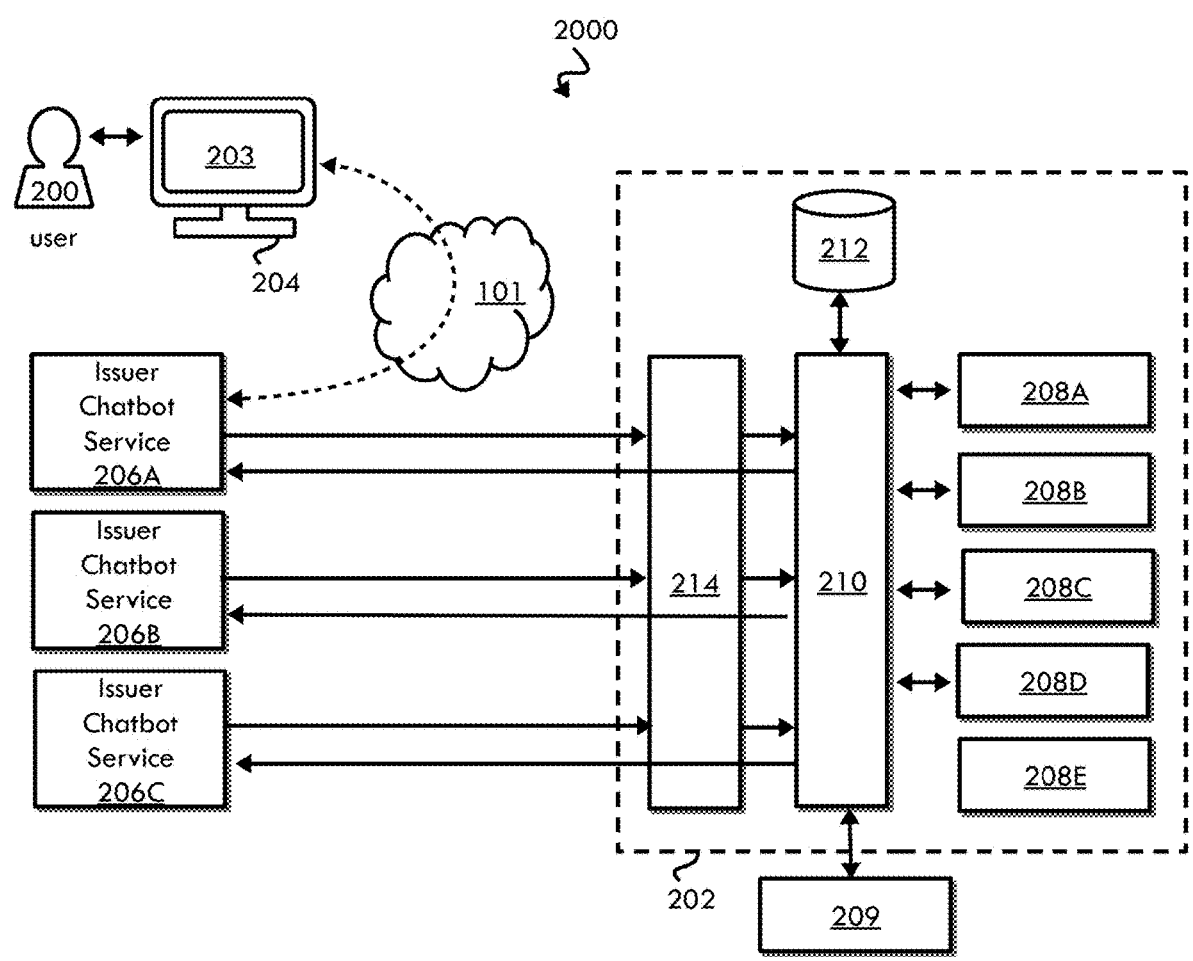
FIG. 2B illustrates a schematic diagram of a non-limiting embodiment of a system for providing an automated chatbot service.

Referring now to FIG. 2B, an automated chatbot system 2002 is shown according to another non-limiting embodiment. In the embodiment shown in FIG. 2B, one or more of the issuer chatbot services 206A-206C may each be configured to communicate plaintext or audio, received from the computing device 204 operated by the user 200, to the API gateway 210 without having been first parsed and/or processed according to a natural language processing algorithm. In such embodiments, the request provided by the issuer chatbot service 206A-206C may include such plaintext or audio. The request may be communicated to an automated chatbot controller 214, which parses and/or processes the request. The automated chatbot controller 214 may include a computing device and/or software executing on a computing device, such as an application executed by a server computer, that receives requests from issuer chatbot services and parses the requests and/or generates requests for one or more APIs 208A-208E through the API gateway 210 or directly to one or more APIs 208A-208E. In non-limiting embodiments, one or more external APIs 209 may be utilized, such as a merchant API, issuer API, and/or third-party API.

In non-limiting embodiments, and with continued reference to FIG. 2B, the automated chatbot controller 214 generates one or more queries which are communicated to the API gateway 210. A query may be a request message for data that includes one or more parameters of the requested data. The API gateway 210, based on the query, may then redirect the query or generate a new query to one of the APIs 208A-208E. The API gateway 210 may then return the result of the query, if there is a result, to the issuer chatbot system 206A-206C that originated the request. In some non-limiting embodiments, one of the APIs 208A-208E includes a natural language processing service that processes an input to identify one or more queries and returns the one or more queries to the API gateway 210, where the queries are communicated to other APIs 208A-208E and/or external APIs 209.

Still referring to FIG. 2B, as an example, if an issuer chatbot service 206A receives a request from a user for information concerning a particular PAN, the API gateway 210 and/or automated chatbot controller 214 may identify one or more chatbot options in the chatbot database 212 based on the BIN associated with the PAN. It will be appreciated that other issuer identifiers may be used to determine the one or more chatbot options associated with the issuer chatbot service 206A. For example, a BIN of "1234" may be associated with a persona that was selected by and/or customized for the issuer chat service. The automated chatbot controller 214 may therefore use the associated persona for responding to the request. In another example, a BIN of "1234" may be associated with a travel notification chatbot option that enables a user to place a travel notification on his or her account prior to traveling. In some examples, if a travel notification chatbot option is associated with the issuer chatbot system, the automated chatbot controller may automatically generate a request to an API to determine if the user is likely to travel soon and, in response to such a determination, prompt the user to confirm that he or she is traveling. Travel dates and itineraries may be determined from transaction data for transportation and accommodation expenditures through one or more microservices configured to infer dates and times from such tranactions. In response to a confirmation that the user is traveling, the automated chatbot system may generate a request to an API to place a travel notification on the account at the current time or at a specified time in the future.

With reference to FIGS. 2A and 2B, one or more APIs 208A-208E may be available to an issuer chatbot system 206A based on one or more chatbot options associated with the issuer chatbot system. For example, different APIs may be made available to different issuer chatbot systems based on the chatbot options associated with each issuer chatbot system. Such chatbot options may have been selected by an issuer or, in other examples, may be based on a level of service, geographic requirements, regulatory requirements, and/or the like. The API gateway 210, in response to receiving a request from an issuer chatbot system, may query the chatbot database 212 to determine if a function call should be made to one or more APIs 208A-208E. The chatbot options in the chatbot database 212 may also include one or more parameters that may be used to generate a function call to an API such as, but not limited to, a default time period for requests for past transactions, a filter that is applied to the returned data, a format of the returned data, and/or other like parameters. In this manner, the API gateway 210 may receive a query or other type of request and either enhance the request or generate a new request including parameters from the chatbot database.

In non-limiting embodiments, issuers may use one or more GUIs to configure an issuer chatbot service. An chatbot configuration system includes an initialization layer having a client-facing portal of one or more GUIs to facilitate an issuer and/or entity acting on behalf of the issuer to build and/or customize an issuer chatbot service using selectable chatbot options that include modules for functions and/or design elements for the customer-facing GUIs and user experience. In non-limiting embodiments, different chatbot options may be associated with different issuer subscription levels or be made available at a cost as individual modules or packages. It will be appreciated that various other arrangements are possible.

Once an issuer chatbot service is initialized, an orchestration layer may be accessed by an issuer and/or entity acting on behalf of an issuer via one or more GUIs to customize and update the issuer chatbot. As an example, an issuer may enable one or more BINs or BIN ranges for different capabilities with the issuer chatbot service at once. Further, the orchestration layer may be part of an automated chatbot controller that may be used to match one or more chatbot options, such as one or more chatbot modules, with a particular issuer chatbot system to integrate and enable the chatbot options. The orchestration layer may also configure and associate appropriate technical configuration specifications, enablement processes, testing plans, and/or any other operational processes that would facilitate an issuer and/or an entity operating a chatbot system on behalf of an issuer to create a customized chatbot system. In this manner, the orchestration layer may receive API request messages from an issuer chatbot system and map those API requests, by generating a new API request or modifying an existing API request, to one or more specific APIs. Thus, the issuer chatbot system need only interact with a single API, API gateway, and/or automated chatbot controller to access functionality associated with numerous APIs.

Figure 3:
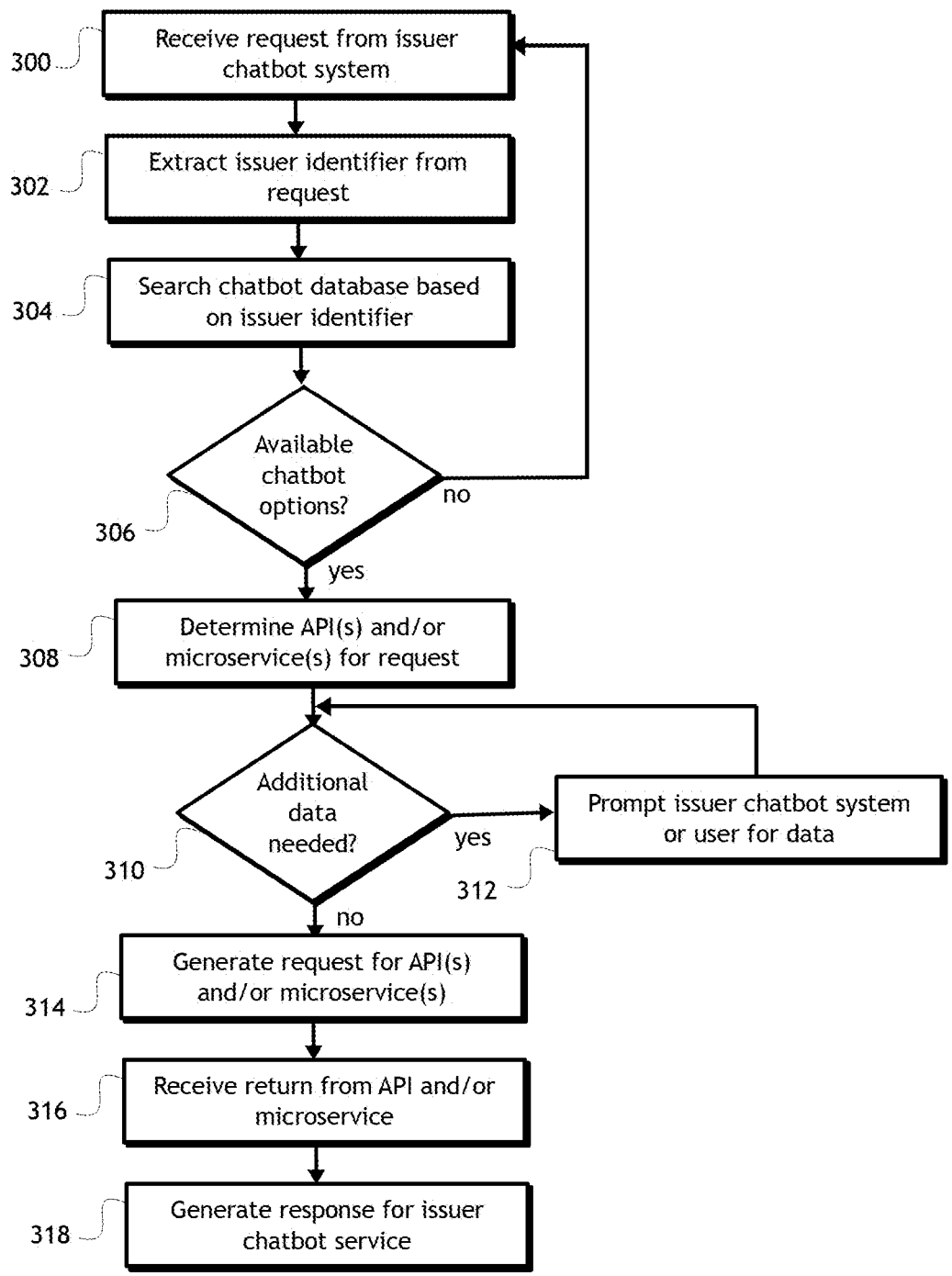
FIG. 3 illustrates a flow diagram of a non-limiting embodiment of a method for providing an automated chatbot service.

Referring now to FIG. 3, a method for providing an automated chatbot is shown according to a non-limiting embodiment. At a first step 300, a request is received from an issuer chatbot system. The request may include a user input, such as plaintext, audio, and/or the like. In some examples in which the issuer chatbot system parses and processes a user input, the request received at step 300 may include one or more parameters for a request for specific transaction data or a specific action to be performed. At step 302, an issuer identifier is extracted from the request. The issuer identifier may be in a field of the request, such as a header or a designated issuer field, and/or may be derived from a network address originating the request. As explained herein, the issuer identifier may identify an issuer, issuer chatbot service, and/or entity operating a chatbot service on behalf of an issuer.

With continued reference to FIG. 3, at step 304 the issuer identifier is used to search a chatbot database for one or more chatbot options or other parameters associated with a corresponding issuer chatbot service. At step 306, based on the search conducted in step 304, it is determined whether there are available chatbot options associated with the issuer identifier. For example, the chatbot options may be associated with all chatbot services offered to end-users by an identified issuer institution. The chatbot options may also be associated with specific groups of end-users or types of accounts, as identified by one or more BINs or BIN ranges, account identifiers, and/or the like, such that the chatbot options associated with an issuer chatbot service may differ among users and be based on the user 200 and/or an account of the user. As an example, a user 200 with a premium account, as identified by a particular BIN or BIN range, may be associated with additional chatbot options as compared to a user with a regular account. It will be appreciated that various other arrangements are possible.

Still referring to FIG. 3, if it is determined that there are no available chatbot options for the issuer identifier at step 306, the method may proceed back to step 300 in which the next request is received from an issuer chatbot system. If there available chatbot options for the issuer identifier at step 306, the method may proceed to step 308 in which one or more APIs and/or microservices may be determined for the request. The request may be processed to identify one or more elements of transaction data and/or one or more actions to be performed. For example, if a request seeks past transactions associated with a particular category of merchant, an API for a microservice for returning past transactions may be identified and an API for a microservice for returning Merchant Category Code (MCC) information may be identified. At step 310, it is determined if additional data is needed for the API(s) and/or microservice(s) identified at step 308. For example, if a request seeks past transactions associated with a particular category of merchant, the API for the microservice for returning past transactions may require, as an input parameter, a time period for the past transactions. In such examples, a default value may be used or the method may proceed to step 312 in which the issuer chatbot system, user, and/or any other data source is prompted or queried for the additional data.

With continued reference to FIG. 3, once all of the data is obtained and no additional data is needed at step 310, the method may proceed to step 314 in which one or more requests for the API(s) and/or microservice(s) identified in step 308 are generated. For example, a request may include a function call for querying data and/or performing an action. At step 316 a return is received from the API(s) and/or microservice(s). For example, if a request seeks past transactions associated with a particular category of merchant, a data structure of past transactions and one or more MCCs may be returned. At step 318, the returns received at step 316 may be processed and a response to the issuer chatbot system may be generated. For example, if a request seeks past transactions associated with a particular category of merchant, the data structure of past transactions may be parsed to identify the transactions associated with the one or more MCCs. Based on this correlation, a response including that subset of transaction data may be generated. The response may include raw values in a data structure or, in other examples, may include a textual or audio response that can be understood by a human recipient. In such examples, the response may be structured as a sentence and may include phraseology or stylings according to one or more personas associated with the issuer chatbot system and identified as a chatbot option at step 306.

In non-limiting embodiments, one or more actions may be performed based on a request message. For example, in non-limiting embodiments, a request from an issuer chatbot service 206A may initiate a transfer of funds from one account to another account. The API gateway 210 and/or automated chatbot controller 214 may communicate a request to an API 208A configured to transfer funds, including a source account identifier, a destination account identifier, an amount to be transferred, and a transfer date. In non-limiting embodiments, the automated chatbot controller 214 may prompt the issuer chatbot service 206A and/or user 200 interacting with the issuer chatbot service 206A for data, such as account identifiers, credentials, confirmations, and/or the like. Further, the automated chatbot controller 214 and/or API gateway 210 may receive additional data from the chatbot database 212 for supplementing the request.

In non-limiting embodiments, the automated chatbot system may be used by a user to retrieve transaction data, such as balances, credit limits, and/or the like, associated with one or more accounts. For example, a user 200 may check a balance of an account by asking an issuer chatbot service 206A for an account balance. The API gateway 210 and/or automated chatbot controller 214 may communicate a request to an API 208B configured to check an account balance. In some examples, the request may be communicated to an external API 209, such as an issuer API, to obtain the account balance information. In some examples, a request may first be communicated to an API 208B which may return account information usable to generate a second request to the external API 209. In non-limiting embodiments, the automated chatbot controller 214 may prompt the issuer chatbot service 206B and/or user 200 interacting with the issuer chatbot service 206B for data for the request, such as account identifiers, credentials, confirmations, and/or the like. Further, the automated chatbot controller 214 and/or API gateway 210 may receive additional data from the chatbot database 212 for supplementing the request.

In non-limiting embodiments, the automated chatbot system may be used by a user to configure alerts such as, for example, transaction alerts, spending alerts, account holder alerts, and/or the like, associated with one or more accounts. For example, a user may ask an issuer chatbot service 206A to be alerted every time a transaction occurs or every time a transaction occurs that exceeds $5. As another example, a user may wish to be alerted every time a transaction occurs at a particular merchant or category of merchants. A user may also wish to be alerted when a total spend during a given time period, such as a month, exceeds a total aggregate value. A user may also wish to be alerted when a specific account holder, such as a child, initiates a transaction with an account identifier corresponding to that account holder. The API gateway 210 and/or automated chatbot controller 214 may communicate a request to an API 208C configured to setup an alert. In non-limiting embodiments, the automated chatbot controller 214 may prompt the issuer chatbot service 206C and/or user 200 interacting with the issuer chatbot service 206C for data for the request, such as a method for delivering the alert (e.g., email, text message, push notification, telephone call, and/or the like), account identifiers, credentials, confirmations, and/or the like. Further, the automated chatbot controller 214 and/or API gateway 210 may receive additional data from the chatbot database 212 for supplementing the request.

In non-limiting embodiments, the automated chatbot system may be used by a user to locate an issuer institution and/or an Automated Teller Machine (ATM). For example, a user may ask an issuer chatbot service 206A where the closest branch location or ATM is located. The request may specify the user's current location or, in other examples, the API gateway 210 and/or automated chatbot controller 214 may prompt the computing device 204 of the user for location information (e.g, for GPS information) or may prompt the user 200 to input an address or postal code. The API gateway 210 and/or automated chatbot controller 214 may communicate a request to an API 208D configured to identify the closest branch location or ATM. Further, the automated chatbot controller 214 and/or API gateway 210 may receive additional data from the chatbot database 212 for supplementing the request.

In non-limiting embodiments, the automated chatbot system may be used by a user to retrieve further information about a particular transaction. For example, a user may ask for a list of recent transactions and, in response to the user specifying that a transaction is not recognized, the issuer chatbot service 206A may return additional transaction information. For example, based on identifying the transaction (e.g., based on a transaction identifier, a transaction amount, a merchant, and/or the like), the API gateway 210 and/or automated chatbot controller 214 may communicate a request to an API 208E or multiple APIs 208A-208E to obtain further information about the transaction. As an example, based on a merchant identifier associated with the transaction, a request may be sent to an external API 209 to return a street address or a map of the merchant location. As a further example, based on the transaction data, a request may be sent to an external API 209 of a merchant or of a third party to return an identification of one or more specific items that were purchased. With this additional information concerning a transaction from one or more APIs 208A-208E, an enriched receipt may be generated that shows transaction data that is not available on a typical receipt or provided by a transaction service provider, such as a merchant location, one or more specific items or services, benefits associated with the transaction (e.g., loyalty benefits, offers, and/or the like), and/or other like transaction data.

Figure 4:
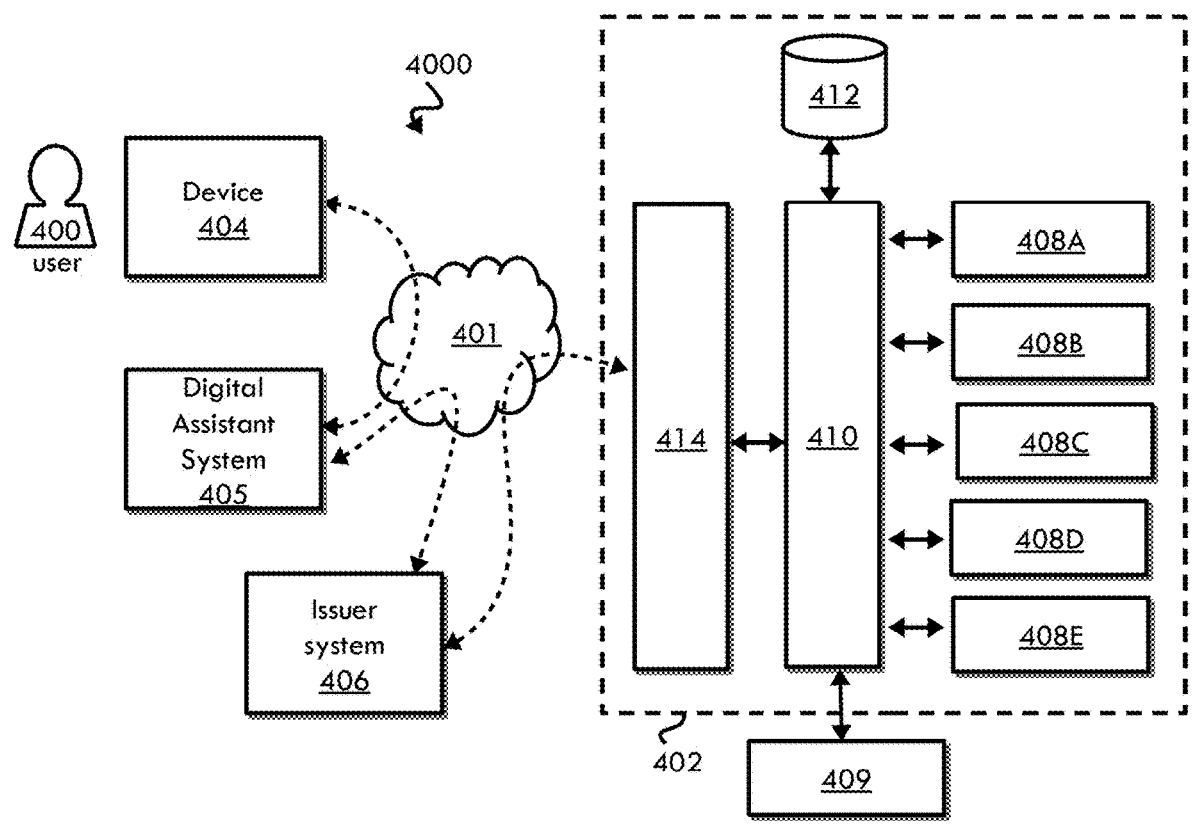
FIG. 4 illustrates a schematic diagram of a non-limiting embodiment of a system for providing an automated chatbot service.

Referring now to FIG. 4, an automated chatbot system 4000 is shown according to another non-limiting embodiment. In the example shown, a user 400 interacts with a computing device 404 by typing, speaking, and/or providing any other type of input. The computing device 404 is in communication with a digital assistant system 405, such as a server associated with Amazon's Alexa®, Google Home®, Apple's Siri®, and/or other like digital assistants. The user 400 may request transaction data or an action through an input to the computing device 404, which communicates the input to a digital assistant system 405 to be parsed and processed. The digital assistant system 405, in response to determining that the user 400 is requesting transaction data and/or an action to be performed, may identify an issuer system 406, such as an issuer chatbot system, an issuer API, and/or the like, that corresponds to the account of the user 400. The digital assistant system 405 may identify the issuer system 406 by name, account identifier (e.g., an account identifier on record with the digital assistant system), BIN, or in any other manner. The digital assistant system 405 may then communicate a request to the issuer system 406. The issuer system 406 may relay the request to an automated chatbot controller 414 and/or an API gateway 410 which, as described herein, may generate a request or send the request to one or more APIs 408A-408E.

With continued reference to FIG. 4, in some non-limiting embodiments, the digital assistant system 405 may communicate directly with the automated chatbot controller 414 and/or the API gateway 410 without involvement of an issuer system 406. In such examples, the automated chatbot controller 414 and/or the API gateway 410 may use the request received from the digital assistant system 405 to identify one or more chatbot options 412 in a chatbot database. The chatbot options 412, in some examples, may have been provided by an issuer institution or another entity through a selection process. As an example, a user 400 may speak to a digital assistant (operated on computing device 404) and notify the digital assistant that the user 400 is planning to travel overseas. The digital assistant system 405 may be configured to recognize the user's 400 intent to travel overseas and to generate one or more requests to the issuer system 406, automated chatbot controller 414, and/or API gateway 410. In other examples, the digital assistant system 405 may be configured to recognize a specific request from a user 400 (e.g., "notify my bank that I am traveling") that includes one or more intents and/or keywords (e.g., "bank"). In response to detecting a request that is meant for a bank, the digital assistant system 405 may search for any associated financial accounts of the user 400. In response to determining that the user 400 has a credit card with Bank X corresponding to issuer system 406, the digital assistant system 405 may communicate the request to the issuer system 406, automated chatbot controller 414, and/or API gateway 410. The request communicated from the digital assistant system 405 may include data that is fully processed, partially processed, or not processed. For example, the digital assistant system 405 may communicate a plaintext input of the user 400 to the issuer system 406, automated chatbot controller 414, and/or API gateway 410, such that the plaintext input can be parsed and processed external to the digital assistant system 405. In other examples, the digital assistant system 405 fully parses and processes the input and generates an API request.

Although several of the non-limiting examples described herein concern issuer chatbot systems, it will be appreciated that non-limiting embodiments of automated chatbot system described herein may be used with any entities wishing to provide chatbot services to users.

Figure 5A:
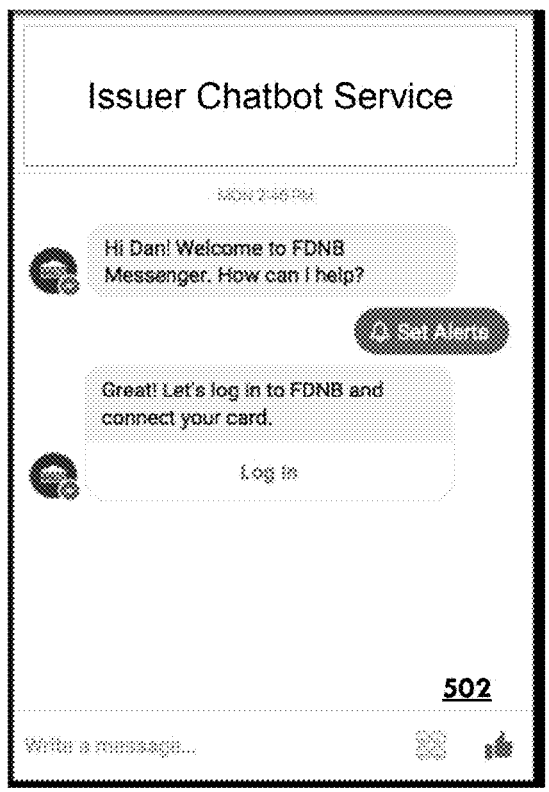
FIGS. 5A-5D illustrate graphical user interfaces (GUIs) for adding an account according to a non-limiting embodiment.
Figure 5B:
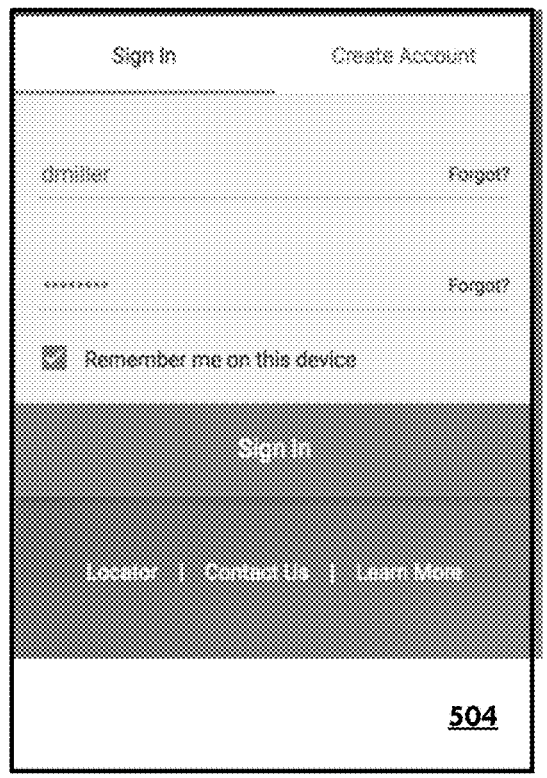
Figure 5C:
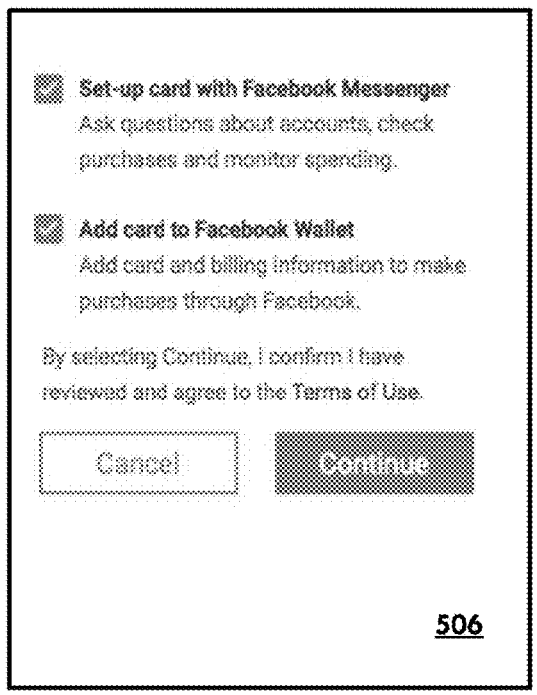
Figure 5D:

FIGS. 5A-5D illustrate graphical user interfaces (GUIs) for associating an account with a chatbot service and setting an alert according to a non-limiting embodiment. As shown in FIG. 5A, a user may access a chatbot GUI 502 for an issuer chatbot service and ask to set alerts with a textual input or selection of an option. In response to the user request, the issuer chatbot system may present or link to a further GUI 504, shown in FIG. 5B, for logging into an issuer system and associating one or more accounts with a chatbot service. The GUI 504 shown in FIG. 5B may be a separate webpage or application and, in other examples, may be en embedded object in the chat GUI 502. FIG. 5C shows a further GUI 506 for associating an account with a particular chat service (e.g., Facebook® Messenger) according to a non-limiting embodiment. FIG. 5D illustrates a confirmation GUI 507 that notifies the user that the identified account was linked with the chatbot service.

Figure 5E:
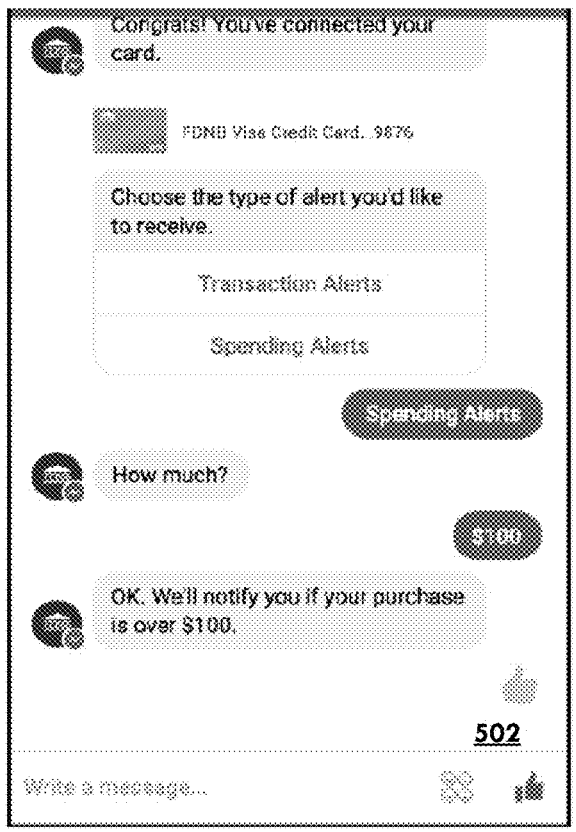
FIGS. 5E and 5F illustrate GUIs for configuring an alert according to a non-limiting embodiment.
Figure 5F:
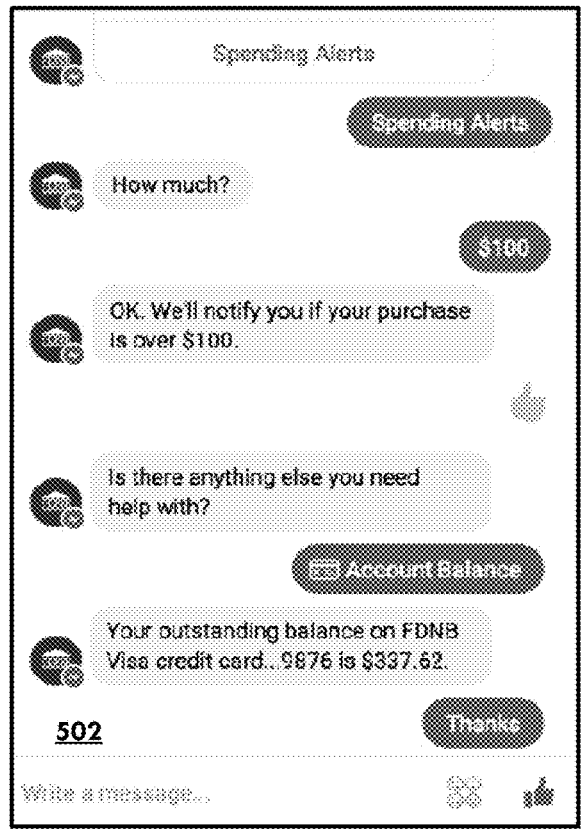

Referring now to FIGS. 5E-5F, the chatbot GUI 502 is shown for setting transaction alerts according to a non-limiting embodiment. After associating the user's account with the chatbot service in FIGS. 5A-5D, the chatbot GUI 502 may prompt the user to input a type of alert (e.g., transaction alert or spending alert). In the example shown, the user selects spending alerts by typing a response or selecting an option. In response to the user input, the chatbot service asks the user for an amount to be associated with the spending alert. The user inputs $100 and, in response to the input, the chatbot service generates one or more requests to be communicated to one or more APIs, an API gateway, and/or an automated chatbot controller. FIG. 5F shows a further non-limiting example of the chatbot GUI 502 in which a user asks to check an account balance for the account previously associated with the chatbot service.

Figure 6A:
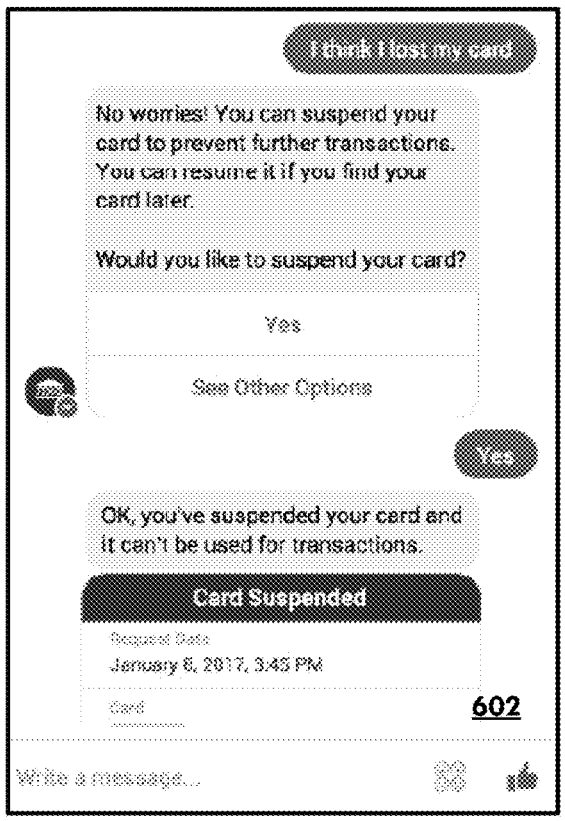
FIGS. 6A-6C illustrate GUIs for reporting a lost or stolen card according to a non-limiting embodiment.
Figure 6B:
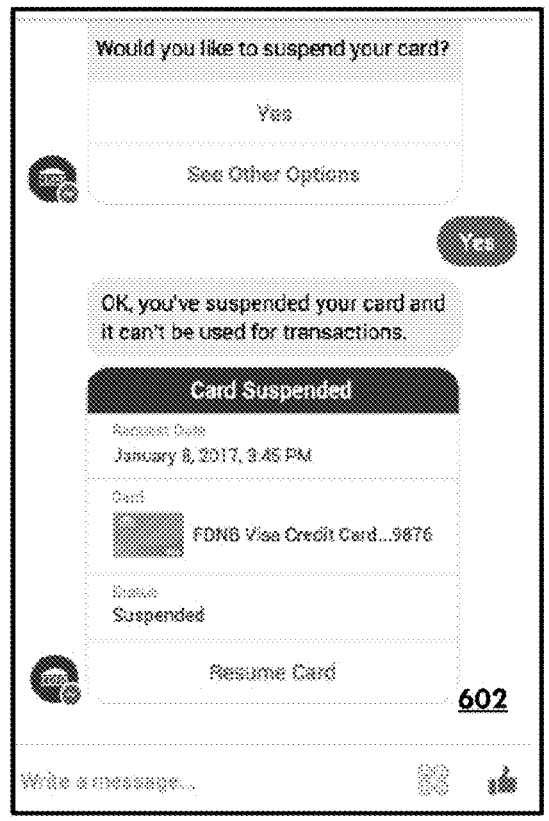
Figure 6C:
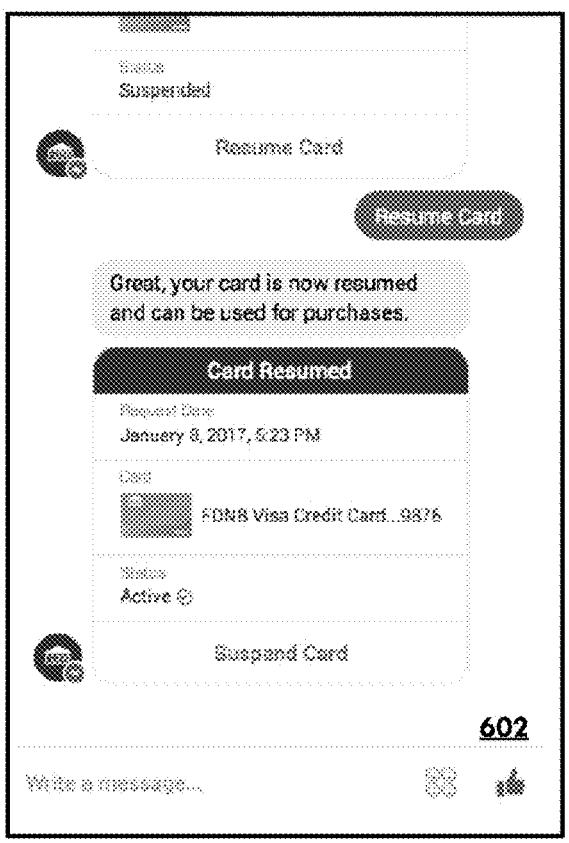

Referring now to FIGS. 6A-6C, a chatbot GUI 602 for reporting a lost or stolen card is shown according to a non-limiting embodiment. As shown in FIG. 6A, in response to a user input indicating a lost payment device, the chatbot service prompts the user for options to suspend the account. In response to the user requesting suspension of the account, and as shown in FIGS. 6B and 6C, the chatbot service presents an option for the user to resume activation of the account (e.g., reverse the suspension).

Figure 7A:
FIG. 7A-7C illustrate GUIs for providing travel notifications according to a non-limiting embodiment.
Figure 7B:
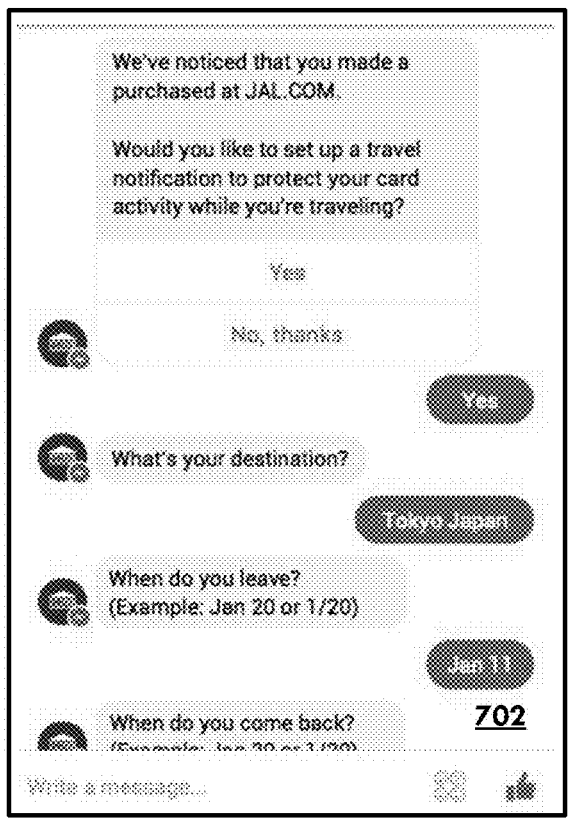
Figure 7C:
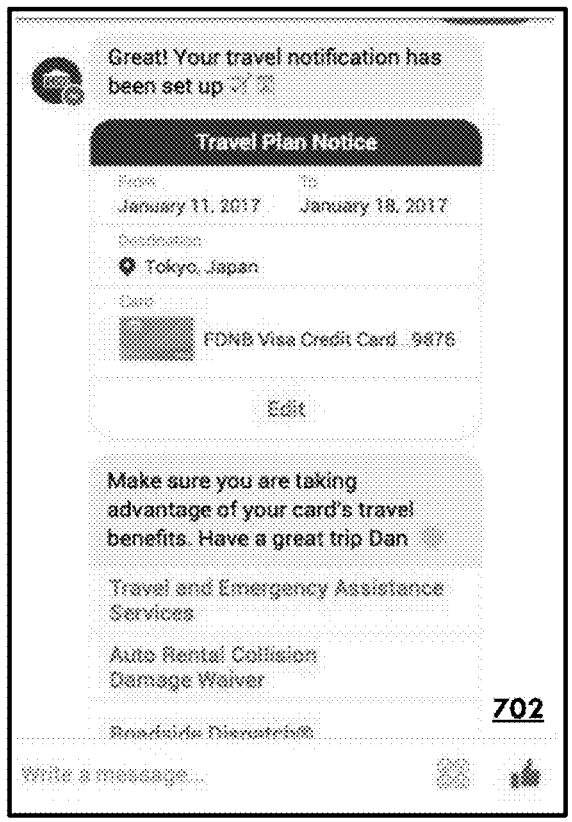

Referring now to FIGS. 7A-7C, a chatbot GUI 702 for notifying an issuer institution of travel activity is shown according to a non-limiting embodiment. In FIG. 7A, the chatbot service notifies the user that the associated account was used to make a purchase at Japan Airlines, in accordance with one or more alerts setup by the user or the issuer. In FIG. 7B, the chatbot service, in response to determining that a travel-related purchase was made (e.g., by merchant identifier, MCC, and/or the like), prompts the user to set up a travel notification and for additional information needed for the travel notification. In some non-limiting examples, the chatbot service may generate one or more requests to be communicated to one or more APIs, an API gateway, and/or an automated chatbot controller to obtain further travel itinerary information as derived from other transaction data. In FIG. 7C, the chatbot service presents other options and offers associated with the travel notification to the user, such as emergency services, car rental options, and/or the like.

Figure 8:
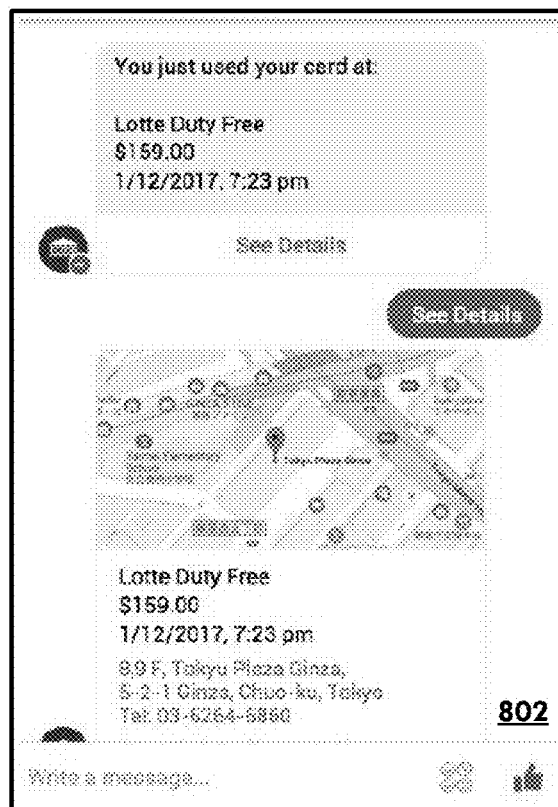
FIG. 8 illustrates a GUI for providing an enriched receipt according to a non-limiting embodiment.

Referring now to FIG. 8, a chatbot GUI 802 for displaying an enriched receipt is shown according to a non-limiting embodiment. In some examples, an alert may be configured to generate and provide an enriched receipt to a user in response to a transaction or in response to a transaction having specified parameters (e.g., exceeding a specified amount, an overseas transaction, and/or the like). In some examples, an enriched receipt may be generated and provided to a user in response to a request for additional information concerning a transaction. It will be appreciated that various other arrangements are possible.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the invention contemplates that, to the extent possible, one or more features of any embodiment can be combined with one or more features of any other embodiment or aspect.

What is claimed is:

1. A method for implementing an automated chatbot, comprising:
generating, with at least one processor of a transaction processing system, at least one graphical user interface comprising a plurality of selectable options corresponding to a plurality of chatbot options;
receiving, through the graphical user interface, a plurality of selections from at least a subset of the plurality of chatbot options;
associating, in a database of the transaction processing system, the plurality of selections with at least one issuer identifier;
receiving, from a chatbot system, a request message comprising the at least one issuer identifier;
identifying, with the at least one processor of the transaction processing system, an issuer system of a plurality of issuer systems based on the at least one issuer identifier;
in response to receiving the request message, performing, with the at least one processor of the transaction processing system at least one action by communicating with the issuer system, the at least one action comprising: flagging an account for travel, report a stolen payment device, report a lost payment device, transfer funds, link accounts, enable notifications, disable notifications, ATM, or any combination thereof;
generating, with the at least one processor of the transaction processing system, a response message comprising transaction data based on the request message and at least one chatbot option corresponding to at least one selection of the plurality of selections associated with the at least one issuer identifier; and
communicating, with at least one processor of the transaction processing system, the response message to the chatbot system.

2. The method of claim 1, wherein the request message comprises a plaintext input received from a user through the chatbot system, and wherein generating the response message comprises:
parsing the plaintext input with at least one natural language processing algorithm to identify at least one query;
determining an Application Programming Interface (API) from a plurality of APIs based at least partially on the at least one query; and
submitting the query to the API to retrieve the transaction data.

3. The method of claim 2, wherein determining the API from the plurality of APIs comprises submitting the at least one query to an API gateway, wherein the API gateway comprises a plurality of microservices configured to provide the plurality of chatbot options.

4. The method of claim 1, wherein the request message comprises at least one query generated by the chatbot system based on a plaintext input from a user, and wherein generating the response message comprises:
determining an Application Programming Interface (API) from a plurality of APIs based at least partially on the at least one query; and
submitting the query to the API to retrieve the transaction data.

5. The method of claim 4, further comprising determining, based on the request message, to perform at least one action, wherein the at least one query submitted to the API identifies the at least one action.

6. The method of claim 1, wherein the at least one issuer identifier comprises at least one of the following: a Bank Identification Number (BIN), a range of BINs, an issuer chatbot system identifier, an issuer system identifier, or any combination thereof.

7. The method of claim 1, wherein the plurality of chatbot options comprises a plurality of modules, wherein each module of the plurality of modules corresponds to at least one function or API of the plurality of APIs.

8. The method of claim 1, wherein the plurality of chatbot options comprises a plurality of user interface elements.

9. The method of claim 1, wherein the chatbot system comprises at least one of the following: a voice bot configured to communicate with the user via audio, a text bot configured to communicate with the user via text, or any combination thereof.

10. The method of claim 1, wherein the request message comprises an input received from a user through the chatbot system, and wherein generating the response message comprises:
determining, with the at least one processor, that the input comprises a message concerning a lost payment device;
determining an Application Programming Interface (API) for retrieving past transactions in response to determining that the input comprises a message concerning the lost payment device;
retrieving, using the API, a plurality of past transactions associated with the lost payment device, wherein the transaction data comprises the plurality of past transactions associated with the lost payment device.

11. The method of claim 10, further comprising:
receiving, from the chatbot system, a user input responsive to the plurality of past transactions;
verifying, based on the user input, the plurality of past transactions as valid; and in response to verifying the plurality of past transactions, prompting the user, through the chatbot system, to freeze an account associated with the lost payment device.

12. The method of claim 1, wherein the request message comprises an input received from a user through the chatbot system, and wherein generating the response message comprises:
  determining that the input comprises a message concerning an unrecognized transaction;
  determining an Application Programming Interface (API) for retrieving past transactions from a plurality of APIs in response to determining that the input comprises a message concerning the unrecognized transaction; and
  retrieving, using the API, merchant data associated with the unrecognized transaction, wherein the transaction data comprises the merchant data.

13. The method of claim 12, further comprising generating a rich receipt based at least partially on the merchant data associated with the unrecognized transaction.

14. The method of claim 1, wherein the chatbot system receives a request from a digital assistant system in communication with the chatbot system, and wherein the chatbot system communicates the request message comprising the at least one issuer identifier in response to receiving the request from the digital assistant.

15. An automated chatbot system, comprising:
  at least one processor in communication with a transaction processing system, the at least one processor programmed and/or configured to:
  generate at least one graphical user interface comprising a plurality of selectable options corresponding to a plurality of chatbot options;
  receive a plurality of selections from at least a subset of the plurality of chatbot options;
  associate, in a database of the transaction processing system, the plurality of selections with at least one issuer identifier;
  receive, from a chatbot system, a request message comprising the at least one issuer identifier;
  identifying, with the at least one processor of the transaction processing system, an issuer system of a plurality of issuer systems based on the at least one issuer identifier:
  in response to receiving the request message, perform at least one action by communicating with the issuer system, the at least one action comprising: flagging an account for travel, report a stolen payment device, report a lost payment device, transfer funds, link accounts, enable notifications, disable notifications, configure an alert, or any combination thereof;
  generate a response message comprising transaction data based on the request message and at least one chatbot option corresponding to at least one selection of the plurality of selections associated with the at least one issuer identifier; and
  communicate the response message to the chatbot system.

16. The system of claim 15, wherein the request message comprises a plaintext input received from a user through the chatbot system, and wherein generating the response message comprises:
  parsing the plaintext input with at least one natural language processing algorithm to identify at least one query;
  determining an Application Programming Interface (API) from a plurality of APIs based at least partially on the at least one query; and
  submitting the query to the API to retrieve the transaction data.

17. The system of claim 16, wherein determining the API from the plurality of APIs comprises submitting the at least one query to an API gateway, wherein the API gateway comprises a plurality of microservices configured to provide the plurality of chatbot options.

18. The system of claim 16, wherein the at least one processor is further programmed and/or configured to determine, based on the request message, to perform at least one action, wherein the at least one query submitted to the API identifies the at least one action.

19. The system of claim 16, wherein the plurality of chatbot options comprise a plurality of modules, wherein each module of the plurality of modules corresponds to at least one function or API of the plurality of APIs.

20. The system of claim 15, wherein the request message comprises at least one query generated by the chatbot system based on a plaintext input from a user, and wherein generating the response message comprises:
  determining an Application Programming Interface (API) from a plurality of APIs based at least partially on the at least one query; and
  submitting the query to the API to retrieve the transaction data.

21. The system of claim 15, wherein the request message comprises an input received from a user through the chatbot system, and wherein generating the response message comprises:
  determining that the input comprises a message concerning a lost payment device;
  determining an Application Programming Interface (API) for retrieving past transactions in response to determining that the input comprises a message concerning the lost payment device; and
  retrieving, using the API, a plurality of past transactions associated with the lost payment device, wherein the transaction data comprises the plurality of past transactions associated with the lost payment device.

22. The system of claim 21, wherein the at least one processor is further programmed and/or configured to:
  receive, from the chatbot system, a user input responsive to the plurality of past transactions;
  verify, based on the user input, the plurality of past transactions as valid; and
  in response to verifying the plurality of past transactions, prompt the user, through the chatbot system, to freeze an account associated with the lost payment device.

23. The system of claim 15, wherein the request message comprises an input received from a user through the chatbot system, and wherein generating the response message comprises:
  determining that the input comprises a message concerning an unrecognized transaction;
  determining an Application Programming Interface (API) for retrieving past transactions from a plurality of APIs in response to determining that the input comprises a message concerning an unrecognized transaction; and
  retrieving, using the API, merchant data associated with the unrecognized transaction, wherein the transaction data comprises the merchant data.

24. A computer program product for implementing an automated chatbot, comprising at least one non-transitory computer-readable medium including program instructions that, when executed by at least one processor, cause the at least one processor to:

generate at least one graphical user interface comprising a plurality of selectable options corresponding to a plurality of chatbot options;

receive a plurality of selections from at least a subset of the plurality of chatbot options;

associate, in a database, the plurality of selections with at least one identifier;

receive, from a chatbot system, a request message comprising the at least one identifier;

identifying, with the at least one processor of the transaction processing system, an issuer system of a plurality of issuer systems based on the at least one issuer identifier;

in response to receiving the request message, perform at least one action by communicating with the issuer system, the at least one action comprising: flagging an account for travel, report a stolen payment device, report a lost payment device, transfer funds, link accounts, enable notifications, disable notifications, configure an alert, or any combination thereof;

generate a response message comprising transaction data based on the request message and at least one chatbot option corresponding to at least one selection of the plurality of selections associated with the at least one identifier; and communicate the response message to the chatbot system.

* * * * *